Patented Mar. 21, 1939

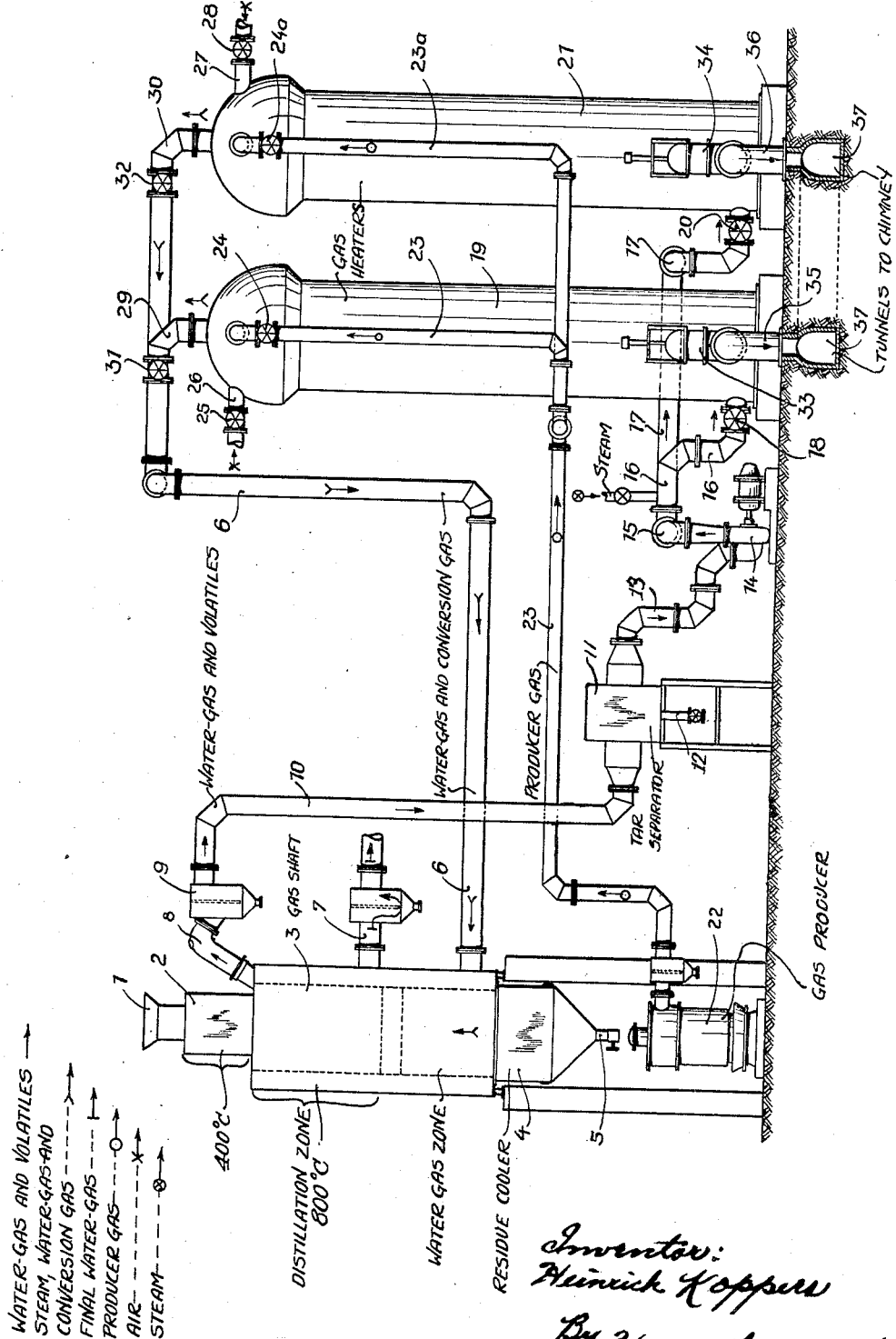

2,151,121

UNITED STATES PATENT OFFICE 2,151,121

PRODUCTION OF WATER GAS

Heinrich Koppers, Essen-on-the-Ruhr, Germany, assignor, by mesne assignments, to Koppers Company, Pittsburgh, Pa., a corporation of Delaware Application June 25, 1936, Serial No. 87,300
In Germany June 29, 1935

5 Claims.  (Cl. 48—202)

The invention relates to the production of a gas, containing carbon monoxide and hydrogen in a definite ratio, by the reaction of bituminous fuel with steam at high temperatures in accordance with a well known type of water gas process.

Recently certain processes for the production of hydrocarbons, for example motor fuels, in which carbon monoxide and hydrogen are converted in the presence of catalyzers, have obtained some importance. For such processes a gas containing carbon monoxide and hydrogen in a ratio of 1:2 or thereabouts is required as the raw material.

The best known process for the production of a gas containing carbon monoxide and hydrogen is the known water gas process in which carbon, for example in the form of coke or coal or other suitable fuel, is reacted with steam at high temperature. By means of the water gas process a gas can be obtained containing approximately 40% CO, 50% $H_2$ and about 5% $CO_2$. By decreasing the temperature of reaction and the time of reaction (decreasing the height of the fuel bed) a gas can be obtained with the known water gas process which contains less carbon monoxide and more hydrogen; however, the content of carbon dioxide in the gas then increases. For example a gas can be produced containing 32.5% CO, 52.15% $H_2$, and 10% $CO_2$ together with 5% nitrogen. Such a high content of carbon dioxide should not however be present in gases used for the synthesis of hydrocarbons. It can therefore be said that it is not possible by means of the known water gas processes to produce an initial fuel suitable for the synthesis of hydrocarbons, i. e., a gas containing carbon monoxide and hydrogen in the ratio of 1:2 with a low carbon dioxide content (preferably under 10%) and with an entire carbon monoxide and hydrogen content of 85%.

It is possible to remove the carbon dioxide from a gas rich in carbon dioxide but containing carbon monoxide and water gas in the desired ratio, by washing the gas with a liquid which absorbs carbon dioxide. It is also possible to produce hydrogen by itself for example by electrolysis and to admix the hydrogen with the water gas to obtain the desired hydrogen content or to convert coke oven gas to gas rich in hydrogen in a water gas generator. All these methods are however very expensive or require special apparatus, the installation of which increases the cost of the synthesis plant to such an extent that the profitability of the synthetic production of hydrocarbons is questionable.

The main purpose of my present invention consists in providing such improvements in the production of a gas, containing carbon monoxide and hydrogen, by means of the water gas process that a gas is obtained in which the ratio of carbon monoxide to hydrogen is approximately 1:2 and the content of carbon dioxide is low, for example about 14%.

The new process forming the subject of the invention consists essentially of the following features.

A bituminous fuel for example pit coal, brown coal, lignite, shale or the like is used as the raw material for the production of the gas. Such fuels split up during heating (distillation) into hydrocarbons and various tarry constituents. In the process according to my invention these hydrocarbons distilled from the fuel are completely or partly converted into hydrogen and carbon monoxide, for example by conversion with steam at high temperatures. In this specification I refer to the gas produced in this way—as "conversion gas". The conversion gas is added to the water gas whereby the hydrogen content of the latter is increased compared with the carbon monoxide. The exact ratio of carbon monoxide to hydrogen in the gas produced by the combination of the conversion gas with the water gas is obtained according to the invention through the fact that not all of the fuel which is heated (distilled) in order to obtain the tarry constituents, is changed into water gas but only such a quantity that the entire gas contains carbon monoxide and hydrogen and carbon dioxide in the desired proportions whilst the remainder of the fuel is used apart from the water gas process in order to produce the heat required for the maintenance of the water gas reaction and the distillation of the bituminous fuel.

According to my invention I preferably use this particular method of operation in conjunction with the continuous production of water gas. It is known to produce water gas continuously in such a way that the fuel to be gasified for example a bituminous fuel, is brought into contact with a mixture of water gas and steam heated to a high temperature. This is effected in practise by withdrawing a part of the water gas, resulting from the reaction between steam and carbon preferably together with the distillation gas resulting from the heating (distillation) of the fuel and introducing the withdrawn gas, after the addition of steam into a heater, for example a regenerator. In this heater the mixture of steam, water gas and distillation gas is heated to a high temperature whereby the hydrocarbons of the distillation gas react completely or partly with the steam with the formation of carbon monoxide and hydrogen. The highly heated steam-gas mixture is then brought into contact with the fuel for example in a vertical shaft consisting of fireproof brickwork. The gas thus acts as a heat transferer whilst yielding its heat to the fuel in order to maintain the water gas reaction. In this process apart from the actual water gas formation process, there is a considerable heat required for heating up the gas heater in which the gas-steam mixture is brought to the temperature required for maintaining the water gas reaction. According to my invention the solid fuel removed from the water gas production process serves to produce the heat for heating up the heater for the gas-steam mixture. This is preferably effected by converting the solid fuel in an air-gas producer into heating gas which is used to heat up the gas heater of the water gas plant.

The invention moreover provides that with fuels very rich in oxygen a pre-heating is provided before the actual distillation of the fuel whereby the greater part of the oxygen is driven out of the fuel in the form of carbon dioxide which is withdrawn separately from the gases and steam arising from the actual distillation.

Finally the invention provides that in the distillation and if necessary the pre-heating of the fuel—the condensable hydrocarbons arising therefrom are removed separately.

In order to understand the invention more clearly I will now describe in detail a plant adapted for the operation of my new process. Such a plant is illustrated schematically in side elevation in the accompanying drawing.

The fuel to be gasified, for example brown coal briquettes, is introduced by means of the device 1 into a container 2 which is constructed with means for heating the inserted fuel up to a temperature 400° C. for example. From the device 2 the fuel passes into a vertical shaft 3 formed of fireproof brickwork. A box shaped cooling device 4 which is provided with a closable opening 5 for the part of the fuel to be withdrawn is attached to the shaft 3.

A pipe connection 6 through which a mixture of steam, water gas and conversion gas heated to a high temperature is introduced into the fuel charge of the gas shaft 3, leads into the lower part of the shaft 3. This highly heated gas-steam mixture gives up its heat in the shaft 3 to the fuel which is thus heated to such a high temperature that the steam reacts with carbon to form water gas. A part of the water gas is withdrawn through the pipe 7 as useful gas. The pipe 7 projects from a middle zone of the shaft 3. The remainder of the water gas rises upwards in the gas shaft 3 and flows through the upper zone of the fuel charge. The bituminous fuel in the upper part of the gas shaft is thus heated to such a temperature that the volatile constituents are driven out of the fuel.

The gases and moisture driven out from the fuel in the upper portion of its bed together with the water gas and steam flowing thereto from the lower part of the fuel bed, are withdrawn from the upper part of the shaft through the pipe 8 which comes out of the cover of the shaft 3. The gases pass first of all into a dust separator 9 and pass from there through the pipe 10 into a tar separator 11, preferably an electrostatic tar deposition apparatus. The apparatus 11 removes the tarry constituents which easily become deposited on the walls of the pipes and would thus cause disturbances in the operation of the plant. The parts separated can be removed from the device 11 through the outlet 12.

In many cases the tar deposited in the apparatus 11 can be used immediately or after suitable treatment. It is however also possible and often advantageous to subject the tar to distillation treatment and to admix the resulting gaseous and vapour hydrocarbons with the gases coming from the tar separating apparatus 11.

From the apparatus 11 the gases pass through the pipe 13 to a blower 14 through which the gases are sucked in on the one side and driven out on the other side into the pipes 15. The pipe 15 is connected with the pipes 16 and 17. Pipe 16 leads, with the interposition of a cut off device 18 to a gas heater 19 and the pipe 17 leads, with the interposition of the cut off device 20 to a gas heater 21.

The gas heaters 19 and 21 are constructed in accordance with known Cowpers which are often used to pre-heat the air for coke ovens. They are provided inside with a grid work of fireproof bricks which serve as heat transfer media. In one operating period the fireproof grid work of the gas heater is heated up and in the other operating period the medium to be heated is passed through the gas heater.

According to the invention a generator gas produced in the air-gas producer 22 is used to heat the gas heaters 19 and 21. From the gas producer 22 a pipe 23 with a pipe 23a branching therefrom leads to the upper end of the gas heater 19 and 21 with the interposition of the cut off valves 24 and 24a. Air for combustion can be introduced into the gas heater 19 through the pipe 26 controlled by a valve 25 and into the gas heater 21 through the pipe 27 controlled by a valve 28.

The heater 19 is connected to the flue 37, leading to a chimney, not shown, by means of a pipe 35 controlled by the valve 33, and the heater 21 is connected with the flue 37 by the pipe 36 controlled by the valve 34.

From the dome shaped cover of the gas heater 19, 21, pipes 29 and 30 lead out with the interposition of cut off devices 31 and 32, to the gas pipe 6 which—as already mentioned above—is connected to the lower end of the gas shaft 3.

The operation of the plant illustrated in the drawing is as follows:

It is assumed that the gas heater 19 is freshly heated and the gas heater 21 has cooled off. The hot gas pipe 23 is now cut off from the gas heater 19 by closing the valve 24. Moreover the air valve 25 and the exhaust gas valve 33 are closed. The valve 32 and the valve 20 are then closed and in this way the current of gas to be heated passing through the gas heater 21 is interrupted. The valve 18 and the valve 31 are now opened so that the gas-steam mixture to be heated flows through the hot gas heater 19. The exhaust gas valve 34 is now opened and then the hot gas valve 24a and the air valve 28, so that the grid work of the gas heater 21 is heated up by the combustion of gas and air and the exhaust gas can escape in the flue 37. As soon as the temperature in the gas heater 19 falls below the fixed point, in a similar way—as described above—the gas heater 19 is connected so as to heat up and the gas heater 21 is connected with the pipes 17 and 6.

The fuel to be treated, for example brown coal briquettes, is subjected in the apparatus 2 to a pre-distillation at about 400° C. In this way approximately 80 cu. m. of gas containing 55% $CO_2$, 20% CO, 10% $H_2$, and some methane and oxygen are obtained per ton of fuel. The fuel then passes into the shaft 3. In the upper part of the shaft 3 as far as the middle gas outlet the fuel is heated to a temperature of approximately 800° C. In this way 188 cu. m. of gas containing 13.5% $CO_2$, 17.5% CO, 48.5% $H_2$, 17.7% methane and 2.8% oxygen are obtained per ton of fuel.

The gasified fuel now passes into the lower part of the shaft 3 in which the water-gas formation takes place. If the fuel is there fully gasified about 1800–1900 cu. m. of water-gas per ton of raw material are obtained in the lower part of the shaft 3. The water-gas may contain approximately 28.2% CO, 53.4% $H_2$, 12.6% $CO_2$, and 5.8% $N_2$.

The constituents driven out from the fuel in the upper part of the shaft together with the water-gas supplied through the gas heaters 19, 21 are now introduced into the lower part of the shaft 3. The hydrocarbons driven out from the fuel are converted into carbon monoxide and hydrogen in the heaters 19, 21 by reaction with steam. For example 20 parts of methane with this action give 20 parts of CO and 60 parts of $H_2$. Thus by the conversion of the hydrocarbons in the gas heaters, a gas free from carbon dioxide and of high hydrogen content is obtained which mixes with the water-gas in circulation. The quantity of gas resulting through the conversion of the hydrocarbons with steam in the gas heaters 19, 21 may for example amount to 300 cu. m. per ton of fuel. This gas has the following composition: 28.7% CO, 69.5% $H_2$ and 1.8% $N_2$. It will thus be seen that it is a gas with a higher hydrogen content than a ratio of carbon monoxide to hydrogen of 1:2. The gas is therefore suitable to improve the low hydrogen content of the water-gas. However the quantity of conversion gas rich in hydrogen is too small to bring the total amount of water-gas producible from the fuel to a hydrogen content corresponding to the given ratio of carbon monoxide to water-gas. On account of this, according to the invention the gasification in the lower water-gas zone of the shaft 3 is carried out in such a way that only approximately 1100 cu. m. of water-gas are produced from the above stated composition whilst such a quantity of fuel is drawn out through the outlet 5 un-gasified such that only approximately 70% of the fuel coming into the water-gas formation zone is gasified therein.

By mixing this 1100 cu. m. of water-gas with the mentioned 300 cu. m. conversion gas 1400 cu. m. of gas of the following composition: 10% $CO_2$, 28.3% CO, 56.7% $H_2$ and 5% $N_2$ are obtained. The total carbon monoxide and hydrogen content of the gas is thus 85% and the ratio of CO:$H_2$ is as 1:2. The gas thus corresponds accurately to the requirements necessary in a gas which is to be used for the synthesis of hydrocarbons.

The fuel withdrawn from the gasification shaft 3 is converted into fuel gas in the air-gas producer 22 and—as mentioned—is used to heat the gas heater or other device of the water-gas production plant. Generally the remainder of the fuel is sufficient to cover the total heat requirements of the synthetic gas production.

Those features of invention in apparatus in the foregoing description which relate more particularly to the construction of the gas shaft 3, is the subject matter of my copending application for Letters Patent of the United States, filed June 10, 1936, Serial No. 84,398; and those features of invention in the foregoing description which relate more particularly to removal of tar, distilling the same and conducting the vapors of distillation back into the heating stage in shaft 10, are the subject matter of my copending application for Letters Patent of the United States, filed September 3, 1936, Serial No. 99,327.

I have described in detail above one form of construction of my invention without however limiting my invention to this form of construction. My invention may however be altered as required within the scope of the succeeding claims.

I claim:

1. Process for the production of water gas, containing hydrogen and carbon monoxide in ratio of 2:1 from bituminous fuels while supplying the heat required for the water gas reaction from outside into the fuel, comprising: distilling the bituminous fuel to be treated in an upper distillation zone of a fuel bed with hot water-gas to recover hydrocarbons from said fuel; withdrawing the distillate gas in mixture with the water gas from the distillation zone and converting with steam at high temperature the gaseous fluids resulting from the distillation of the fuel to form hydrogen and carbon monoxide from the hydrocarbons thereof; passing the conversion gases through the distilled fuel in a lower contiguous water-gas zone of the fuel bed along with steam and reacting the distilled fuel and steam at high temperature in the water-gas zone to form water gas in the presence of the conversion gas therein; splitting the stream of water gas and passing a part thereof from the water-gas zone through the fuel in the upper distillation zone and effecting the aforesaid distillation of fuel therewith, and withdrawing the remaining portion of the split stream of water gas in advance of the distillation zone from the water-gas zone itself to a point of use outside the system; and regulating the temperatures for the water-gas reaction in the lower water-gas zone and controlling the time interval for reaction of the fuel therein with the conversion gas and steam therein by removing such quantity of fuel ungasified from the lower water-gas zone per unit of time that CO is formed therein in ratio to H as to produce in the mixture of converted distillate gas and water gas withdrawn from the water-gas zone itself as aforesaid, hydrogen and carbon monoxide in ratio of 2:1 as a result of control of temperature and time of reaction of the conversion gas with the fuel in the lower water-gas zone.

2. Process as defined in claim 1 wherein the temperature during the conversion of the hydrocarbons with steam and during the water-gas formation is kept so high, of the order of 800° C., that in the resulting mixture of water gas and conversion gas a carbon dioxide content is thereby kept below 14%.

3. Process as defined in claim 1 wherein the heat is supplied to the fuel in the water-gas formation stage of the process by means of a heated current of water gas and steam.

4. Process as defined in claim 1 wherein the conversion gas serves as the heat transferring medium for the fuel bed and is supplied with heat by a regenerative gas heater.

5. Process according to claim 1 wherein the fuel to be treated is subjected, before the distillation step, to a preliminary heat treatment at such temperatures of the order of 400° C. that the main part of any carbon dioxide present is driven out of the fuel, and the gaseous products resulting from the pre-treatment are removed separately from the gases from the distillation and water-gas generation zones.

HEINR. KOPPERS.